United States Patent
Moilanen et al.

(10) Patent No.: US 7,324,094 B2
(45) Date of Patent: Jan. 29, 2008

(54) METHOD AND DEVICE FOR GENERATING MULTI-FUNCTIONAL FEEDBACK

(75) Inventors: Hannu Moilanen, Oulu (FI); Ville Kampman, Oulu (FI); Johannes Väänänen, Oulu (FI)

(73) Assignee: Myorigo, S.a.r.l., Willmington, DE (US)

( * ) Notice: Subject to any disclaimer, the term of this patent is extended or adjusted under 35 U.S.C. 154(b) by 441 days.

(21) Appl. No.: 10/840,174

(22) Filed: May 5, 2004

(65) Prior Publication Data

US 2004/0227721 A1     Nov. 18, 2004

Related U.S. Application Data (63) Continuation of application No. PCT/FI02/00889, filed on Nov. 11, 2002, now abandoned.

(30) Foreign Application Priority Data

Nov. 12, 2001   (FI)   .................................. 20012187

(51) Int. Cl.
    *G09G 5/00*     (2006.01)
    *G06F 17/00*     (2006.01)
    *G06F 3/01*     (2006.01)

(52) U.S. Cl. ..................... 345/173; 178/18.01; 463/30; 463/35; 715/701; 715/702

(58) Field of Classification Search ........ 345/156–161, 345/163, 168, 173, 177, 179; 715/701; 463/30, 35–37; 178/18.01, 18.05, 18.06, 178/19.01
See application file for complete search history.

(56) References Cited

U.S. PATENT DOCUMENTS

| | | | |
|---|---|---|---|
| 4,885,565 A | 12/1989 | Embach | |
| 5,241,308 A | 8/1993 | Young | |
| 5,245,245 A | 9/1993 | Goldenberg | |
| 5,436,622 A * | 7/1995 | Gutman et al. | ............... 340/7.6 |
| 6,118,435 A * | 9/2000 | Fujita et al. | ................. 345/173 |
| 6,429,846 B2 * | 8/2002 | Rosenberg et al. | ......... 345/156 |
| 7,039,866 B1 * | 5/2006 | Rosenberg et al. | ......... 715/701 |
| 7,131,073 B2 * | 10/2006 | Rosenberg et al. | ......... 715/856 |
| 2002/0033795 A1 | 3/2002 | Shahoian et al. | |

FOREIGN PATENT DOCUMENTS

| | | |
|---|---|---|
| DE | 43 23 863 A1 | 1/1995 |
| JP | 61 138035 | 8/1986 |
| JP | 02-105919 | 4/1990 |

(Continued)

*Primary Examiner*—Henry N Tran
(74) *Attorney, Agent, or Firm*—Cohen Pontani Lieberman & Pavane LLP (57) ABSTRACT

A method, a dynamic user interface and an electronic device for generating user-detectable multi-functional feedback using a single component in response to a stimulus signal. One or more resonating vibrating elements, such for example as a piezo-bender, are attached to a selected component of the electronic device. Because sensory feedback in the form of a haptic feedback signal, a buzzer signal, a vibratory alert signal and an audio signal are all generatable using such a piezo-element attached for example to a lens or housing of the device, a significant decrease in the space needed and in the required power consumption as compared to prior art devices, in which different feedback signals are generated using separate components, is realized.

16 Claims, 4 Drawing Sheets

FOREIGN PATENT DOCUMENTS

| | | |
|---|---|---|
| JP | 04-137419 | 5/1992 |
| JP | 09-161602 | 6/1997 |
| JP | 11-162277 | 6/1999 |
| JP | 2000-137576 | 5/2000 |
| JP | 2001117715 | 4/2001 |
| WO | W/O 92/00559 | 1/1992 |
| WO | WO 97/31333 | 8/1997 |
| WO | WO 99/66997 | 12/1999 |
| WO | WO 01/27735 A1 | 4/2001 |
| WO | WO 01/52029 | 7/2001 |
| WO | WO 01/54109 A1 | 7/2001 |

* cited by examiner

METHOD AND DEVICE FOR GENERATING MULTI-FUNCTIONAL FEEDBACK

CROSS REFERENCE TO RELATED APPLICATION

This is a continuation of International Application No. PCT/FI02/00889, filed Nov. 11, 2002 (now abandoned).

BACKGROUND OF THE INVENTION

1. Field of the Invention

The present invention relates to electronic devices. In particular, the present invention relates to a novel and improved method, a dynamic user interface and an electronic device for generating user detectable multi-functional feedback.

2. Description of the Related Art

In information technology, the user interface (UI) is everything designed into an information device with which a human being may interact, including display screen, keyboard, mouse, light pen, the appearance of a desktop, illuminated characters, help messages, and how an application program or a Web site invites interaction and responds to it. In early computers there was very little user interface except for a few buttons at an operator's console. The user interface was largely in the form of punched card input and report output.

Personal Digital Assistants (PDA) typically comprise a large display area in proportion to the size of the device. Most PDAs include only a few mechanical buttons in order to provide as large display area as possible. Therefore, the display area is also used as an input device. The display area is usually touch-sensitive so that information can be transferred into the device just by touching the display or using a special tool, e.g. a special pen.

U.S. Pat. No. 5,241,308 (Paragon Systems) describes a touch sensitive panel for generating selected ones of any of a plurality of different signals, each of which is generated by touching a different location on the panel. The apparatus includes also force sensing means for sensing the magnitudes of the forces that are applied to each panel member support by the panel member when the member is touched at a selected location.

Touch-sensitive displays have many advantages over conventional information input methods. The display size can be made bigger when only few mechanical buttons are present. Above all, all the needed buttons can be generated by program basis in an applicable place. There are, however, several problems when a touch-sensitive display is used as a primary information input device. When a user uses his/her finger to touch the display, the user does not necessarily receive any haptic feedback as to whether his/her selection is acceptable or whether the selection has been made at all. A traditional keyboard, on the other hand, always provides some kind of mechanical response to a press of a button.

The main problem is that there is no solution for electronic devices for generating feedback for various stimulus signals with a single integrated component, and which provides a cost-effective solution coupled with minimal power consumption.

U.S. Pat. No. 5,245,245 (Motorola) describes an electronic device comprising a piezo-bender. The device is preferably a pager. When a signal is received, an electrical drive circuit electrically coupled to the piezo-bender drives the piezo-bender with a drive signal to generate vibratory motion in the piezo-bender, and a vibratory alert is thus provided. The device additionally comprises tuning means slidably coupled to the piezo-bender for mechanically tuning the resonance frequency of vibration of the piezo-bender by varying the length of the piezo-bender that can vibrate. It must be noted that the piezo-bender is mechanically tuned so that tuning must be made by a competent technician. It is also difficult to manufacture devices with exactly the same (resonance) characteristics because of the mechanical tuning feature. The solution in U.S. Pat. No. 5,245,245 is also bound to a certain fixed resonance frequency. U.S. Pat. No. 5,245,245 represents a low-profile and reliable vibrator for a selective call receiver. However, the reference publication does not present any connection between user actions and vibratory alert. The solution is not applicable for generating feedback for various stimulus signals with a single integrated component.

Reference publication WO01/54109 (Immersion) represents a solution of haptic feedback for touchpads and other touch controls. In that publication, a user employs a touch-input device for entering control instructions. Moreover, at least one actuator is coupled to the touch input device and outputs a force to provide a haptic sensation to the user contacting the touch surface. In other words, the user receives feedback from the input device itself. The actuator is situated under the touch-sensitive display. However, the solution presented in this reference publication is not applicable for generating feedback for various stimulus signals with a single integrated component.

The expression "touch-sensitive display" refers preferably to such displays that are being used in current PDAs. These displays, however, have weaknesses. The display is vulnerable to external impacts. The display may also be temperature sensitive, i.e. the use of a device with a touch-sensitive display may be restricted to a certain temperature range.

SUMMARY OF THE INVENTION

The present invention describes a method and an electronic device for generating user detectable multi-functional feedback with a single component in response to a stimulus signal. In the preferred embodiment, the electronic device is a hand-held device comprising at least a housing, electronic circuitry located in the housing, and a display, with the housing comprising at least a partially transparent lens, and the transparent lens area covering at least the display.

An electronic device in accordance with the present invention comprises one or more resonating vibrating elements attached to the housing or on the electronic circuitry. In a preferred embodiment, one or more resonating vibrating elements are attached to an area of the lens not covering the display. The lens is not necessarily a touch-sensitive display as represented in the background of the invention section. Instead, the lens may be more like a panel where the lens itself is not touch-sensitive. When the resonating element(s) are attached to the lens, the feedback is transmitted to the user of the electronic hand-held device effectively through the lens. With the resonating vibrating elements, the feedback is produced to the user in response to the stimulus signal. The resonating vibrating element is preferably a piezo-electric bender.

The touch-sensitive feature is achieved with special detecting means. In a preferred embodiment, the detecting means refer to one or more force sensors attached to the lens. In one embodiment, the electronic device comprises at least force sensors with which the location of a touch on the display can be determined.

In the present invention, an electrical drive circuit is electrically coupled to the resonating vibrating element(s) for electrically driving the resonating vibrating element(s) with a drive signal. The drive signal is constituted based on the stimulus signal. The stimulus signal is preferably a user-actuated signal, a radio signal received via a radio receiver of the electronic device or an electronic device induced signal. It is also contemplated that one or more different stimulus signals may be detected at the same time. When the drive signal is supplied to the resonating vibrating elements, preferably one or more of the following feedback signals are generated: a haptic feedback signal, a vibratory alert signal, an audio signal, and/or a buzzer signal.

The present invention also provides a dynamic user interface for generating user detectable multi-functional feedback with a single component in response to a stimulus signal in a device, the user interface comprising at least a housing and electronic circuitry located in the housing. The dynamic user interface further comprises means for detecting the stimulus signal, one or more resonating vibrating elements attached to the housing or on the electronic circuitry, and an electrical drive circuit electrically coupled to the resonating vibrating element(s) for electrically driving the resonating vibrating element(s) with a drive signal, the drive signal being constituted based on the stimulus signal.

The present invention has several advantages over the prior-art solutions. In the present invention, the resonating vibrating element(s) may be used to provide several different functions, whereas in the prior-art solutions each function requires a dedicated component in the implementation. This is a clear advantage.

The present invention represents a solution in which power consumption is low. This is a very important feature in electronic hand-held devices. In prior-art solutions, each feedback signal (e.g. a haptic feedback signal, a vibratory alert signal, an audio signal or a buzzer signal) must be generated with a dedicated component. In the present invention, on the other hand, all such feedback signals are generated with a single component and, therefore, there is only one power-consuming component. This enables power consumption to be more readily minimized.

The present invention also provides a solution in which it is not necessary to use conventional touch-sensitive displays. Electronic hand-held devices can be made much more durable because it is not necessary to use any elastic membranes or touch-sensitive displays. Instead, a rigid transparent lens covers the actual display device.

The solution represented by the present invention is simple. Furthermore, it is not prone to manufacturing differences because the feedback can be easily adjusted.

The present invention provides still further advantages. Because the solution uses only a single component to generate feedback, there is a significant space saving in the Printed Circuit Board (PCB). The number of components needed on the PCB is thus reduced. The present invention additionally provides a low-cost solution because of the savings in the components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE CURRENTLY PREFERRED EMBODIMENTS

Reference will now be made in detail to embodiments of the present invention, examples of which are illustrated in the accompanying drawings.

Figure 1:
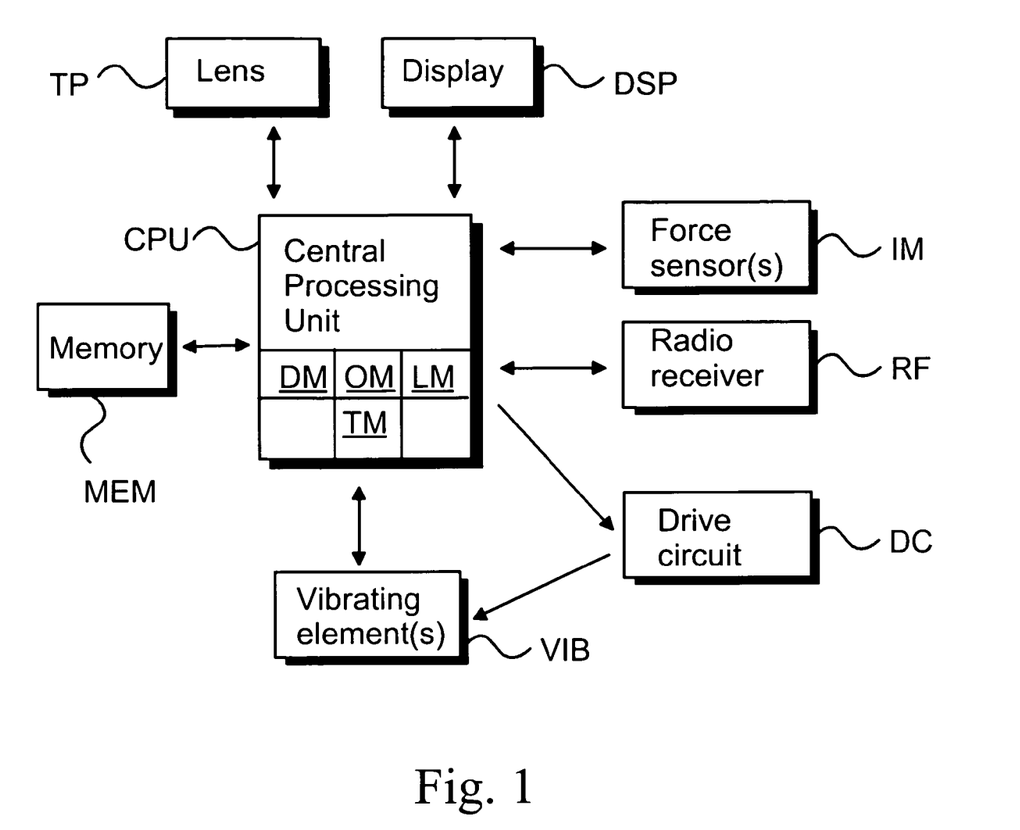
FIG. 1 is a simplified block diagram of an electronic hand-held device, according to the present invention.

FIG. 1 is an electrical block diagram of an electronic hand-held device, e.g. a Personal Digital Assistant (PDA) or a mobile phone. FIG. 1 does not comprise all of the elements required in the electronic hand-held device but only the relevant elements in accordance with the present invention. The electronic hand-held device comprises a central processing unit CPU for controlling the electronic hand-held device. A memory MEM is associated with the CPU to store relevant software applications and other relevant information. The electronic hand-held device comprises at least a partially transparent lens TP which covers at least the display; the term touch panel may also be used when referring to the lens. The actual display DSP is located under the transparent lens TP area.

The lens TP is also used as a primary input device. User actions are detected with means IM for detecting stimulus signals. Means IM for detecting in one embodiment refers preferably to force sensors PS attached directly or indirectly to the lens TP. With three force sensors any location (i.e. a touch) on the lens TP area can be recognised and a relevant procedure started. Means IM for detecting stimulus signals together with the lens TP and the display DSP may refer to a conventional touch-sensitive display. In general, means IM for detecting stimulus signals may refer to several different physical or software components with which the stimulus signal(s) can be detected.

FIG. 1 also comprises a drive circuit DC and vibrating element(s) VIB. The drive circuit (DC) is electrically coupled to the resonating vibrating element(s) (VIB) and electrically drives the resonating vibrating element(s) (VIB) with a drive signal, the drive signal being constituted based on the stimulus signal. A vibrating element is preferably a piezo-electric element attached directly to the lens TP. The CPU controls the drive circuit DC which itself supplies a drive signal to the vibrating element(s) VIB. The piezo-electric element is attached to the lens TP, e.g. by gluing, welding, screwing or any other attachment method, device or facility suitable or appropriate to the use and functionality herein disclosed.

The CPU comprises means DM for determining the source of the stimulus signal, means TM for determining the resonance frequency by producing a bursted frequency sweep, means LM for detecting the vibration level with the force sensors PS, and means OM for feeding the obtained frequency to the resonating vibrating element(s) VIB. These various are preferably implemented in or with the CPU and/or relevant software application(s) or code.

The drive circuit DC in one embodiment comprises several components. It can comprise, e.g. an analog to digital converter (A/D), a digital signal processor, a digital to analog converter (D/A) and an amplifier. When, e.g. a radio signal is received with the radio receiver RF, the radio signal is input to a digital signal processor. The digital signal processor processes the radio signal and inputs the signal to the D/A-converter. The analog signal is then amplified by the amplifier and, finally, the amplified signal is input to the piezo-bender. Because the piezo-bender is attached to the lens TP, the whole system acts like an audio speaker and is able to produce an audio signal.

In one embodiment in accordance with FIG. 1, the vibrating element, e.g. a piezo-bender, is used as the means IM for detecting the user stimulus signal. Therefore, both detecting the user stimulus signal and generating a feedback signal is produced by an integrated component.

In one embodiment, the piezo-bender is also used in measuring acceleration. Preferably there is an external mass attached to the piezo-bender. When a hand-held device comprising a mass attached piezo-bender is moved along the z-axis, the z-axis being essentially perpendicular to the x/y-plane of the display of the hand-held device, the piezo-bender measures force changes (i.e. acceleration) resulting from the inertia. Several functions can be linked to this measurement. For example, the zooming factor of the material on the display of the hand-held device can depend on the measured acceleration information; this zooming example is described in more detail in patent application WO0127735 (Myorigo).

If the electronic hand-held device is a mobile phone and/or a radio, the device will also comprise a radio receiver RF part for sending and receiving radio frequency signals.

Figure 2:
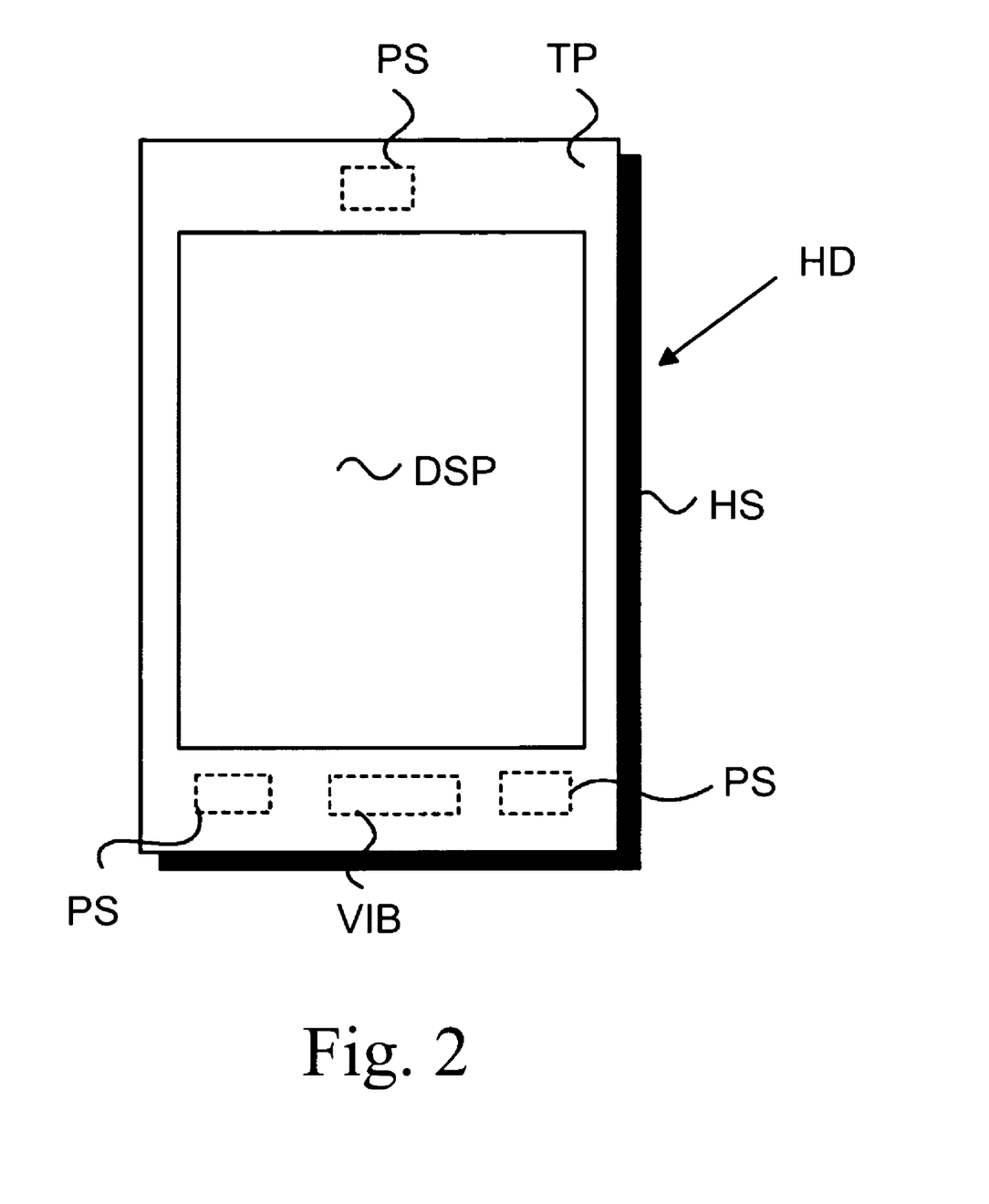
FIG. 2 is a top plan view of an electronic hand-held device, according to the present invention.

FIG. 2 is a top plan view of an electronic hand-held device HD. The device is preferably a Personal Digital Assistant (PDA) or a mobile phone. FIG. 2 is a simplified example of an electronic hand-held device, so the device may additionally comprise other features and/or functional buttons. The electronic hand-held device HD of FIG. 2 comprises a housing HS that has a partially transparent lens TP covering the actual display DSP.

In a preferred embodiment, the lens/touch panel TP itself is not touch-sensitive. Force sensors PS are directly or indirectly attached to the lens TP. In the device depicted in FIG. 2, there are three force sensors PS attached to the lens TP. The force sensors PS are in a preferred embodiment attached to the housing HS, as in a triangular form. The force sensors PS can be attached in any other appropriate way.

By using three or more force sensors PS, it is possible to accurately calculate and determine any location at which the lens TP is touched. With the above-mentioned arrangement, the lens TP itself does not have to contain any touch-sensitive membrane or any other touch-sensitive features. Instead, a touch is detected with the force sensors PS. The force sensors can also sense a user input outside of the transparent lens area. Therefore, certain areas of the housing HS or non-transparent areas of the lens TP can also be used as a part of the user interface.

The device shown in FIG. 2 additionally includes a resonating vibrating element VIB. The resonating vibrating element VIB is attached to an area of the lens TP not covering the display DSP. The lens TP is preferably impervious outside the display DSP area. The vibrating element VIB is preferably a piezo-electric element and may be of unimorph, bimorph or multilayer structure; a multilayer structure is the preferred solution because of the low input voltage required. The piezo-bender is preferably formed of three parts: an upper part, a lower part and a metal element between those parts. The metal element significantly strengthens the overall structure. The drive circuit DC of FIG. 1 applies the desired drive signal to the resonating vibrating element VIB, thus causing the vibrating element VIB to vibrate/resonate at a certain frequency.

In one embodiment in accordance with FIG. 2, the resonating vibrating elements are used to provide multiple feedback signals. The resonating vibrating element is preferably a piezo-bender of unimorph, bimorph or multilayer structure. The stimulus signal can originate from different sources. The stimulus signal can be a user-actuated signal, e.g. a touch on the lens. It can also be a radio frequency signal received via the radio receiver of the electronic device; this is the case where the electronic device is, e.g., a mobile phone. Alternatively, the stimulus signal can be an electronic device induced signal, e.g. an operating system originated signal. Therefore, each stimulus signal may cause a different feedback signal.

When the piezo-bender is used in response to, e.g. a touch on the lens, a pulsed or continuous haptic feedback signal is generated. The haptic feedback signal is typically a short signal, e.g. a frequency of 200-300 Hz and a duration of 5-100, or a continuous signal. This signal is typically a plain or modulated resonance frequency of the piezo-bender. However, the feedback signal does not have to be restricted only to haptic feedback. With a piezo-bender, practically any required or desired frequency bandwidth can be produced. The feedback signal can additionally be a buzzer signal, a vibratory alert signal or an audio signal. This means that a piezo-bender attached to the lens of the electronic hand-held device can act as a speaker. Production of an audio signal may require that the audio bandwidth is flattened by digital signal processing in order to reduce the effect of the cantilever resonance frequencies. Certain criteria must be satisfied when generating audio signals. Especially in implementing the buzzer feature, the sound pressure level (in Pascals) has to be adequate, and the frequency band must be sufficiently broad. In addition, the harmonic multifold frequencies of the resonance frequency can be utilized when generating the feedback signal.

A conventional electronic device comprises different components for generating a haptic feedback signal, a buzzer signal, a vibratory alert signal or an audio signal. In such prior art devices a buzzer signal is generated with a buzzer, an audio signal is generated, e.g. with a speaker, a vibratory alert signal is generated, e.g. with an electromagnetic motor, and a haptic feedback signal is generated, e.g. with a DC motor, a solenoid, a moving magnet actuator, etc. All such feedback signals can in accordance with the present invention be generated with a piezo-element. This means a significant decrement in power consumption as compared to a situation in which the various feedback signals are generated with separate components.

FIGS. 1 and 2 represent only one embodiment of the dynamic user interface described in the present invention. The dynamic user interface is not, however, restricted to any special devices. The dynamic user interface is able to generate user detectable multi-functional feedback with a single component in response to a stimulus signal. The stimulus signal can be a user actuated signal, a radio signal received with a radio receiver or a device induced signal. The user interface comprises at least a housing and electronic circuitry located in the housing. The shape of the housing is not restricted. With means for detecting the stimulus signal a stimulus signal source is defined. One or more resonating vibrating elements is attached to the housing or on the electronic circuitry, e.g. a PCB board located in the housing. An electrical drive circuit electrically coupled to the resonating vibrating element(s) electrically drives the resonating vibrating element(s) with a drive signal, the drive signal being constituted based on the stimulus signal.

The resonating vibrating element is preferably a piezo-bender of unimorph, bimorph or multilayer structure. It is crucial to define the type of the stimulus signal because the feedback signal generated by the piezo-bender solely depends on the stimulus signal. The feedback signal is a haptic feedback signal, a vibratory alert signal, an audio signal or a buzzer signal. It is also important to carefully define the attachment point of the piezo-bender to the housing or to the electronic circuitry. The piezo-bender component itself does not produce all of the needed feedback signals but, attached to the housing or to the electronic circuitry, it is able to produce multi-functional feedback.

There are numerous devices in which the dynamic user interface herein described can be used. Such devices include, by way of illustrative example, joysticks, keyboards, e-books, or practically any device in which multi-functional feedback can be employed.

Figure 3:
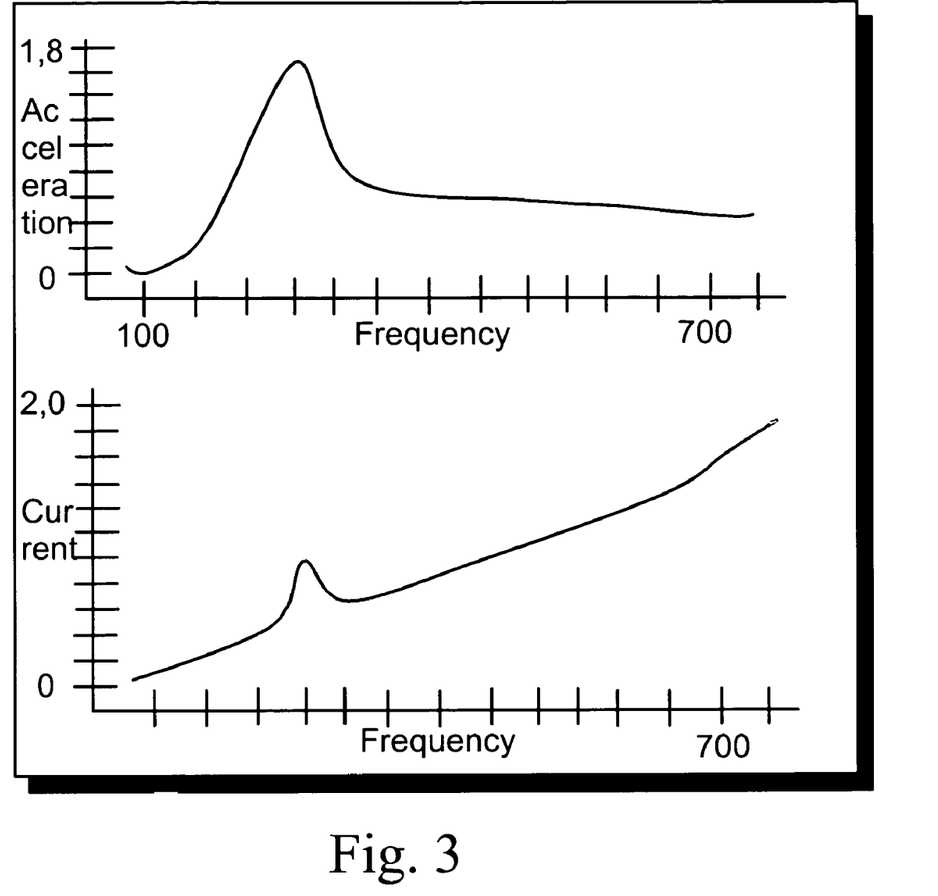
FIG. 3 is a graph illustrating the resonance frequency, according to the present invention.

FIG. 3 depicts the acceleration and the current-frequency response of an exemplary electronic hand-held device. The upper graph represents the acceleration factor of the lens as a function of frequency; the larger the acceleration value, the stronger the feedback to the user. The lower graph represents the current as a function of frequency. In a preferred embodiment of FIG. 3, an external mass is attached to the vibrating element. The use of an external mass increases the force obtained at the clamp point of the piezo-bender and also improves the low-frequency audio bandwidth. The reason that the frequency range for haptic feedback is quite low, e.g. 200-300 Hz, is that normally a human being is not particularly sensitive to higher frequencies, such as through or with an individual's hand. The peak current value is slightly higher at resonance than in the frequencies immediately surrounding the resonance frequency. The acceleration and the current values shown in FIG. 3 are not necessarily real values, but are merely illustrative or exemplary.

The resonance frequency can utilized in yet another way. In the manufacturing phase, the lens or the overall housing may be manufactured such that one of the resonance frequencies of the lens or of the housing is in the same frequency range as that of the vibrating element. In this manner the overall effect of the haptic feedback is rendered more efficient.

It may occur that the resonance frequency must be individually identified. In accordance with the invention the electronic hand-held device comprises a feature by which the optimal frequency may be determined. This is done by determining the resonance frequency by producing a burst frequency sweep. The force sensors can be made use of in another situation. The haptic feedback responses of the vibrating element(s) can be detected with the force sensors. Using the force sensors it is possible to determine the individual resonance frequency. When the measurement is made, the drive circuit is set to feed the obtained frequency to the vibrating element(s).

The feedback parameters can also be individually tuned for each person using the device. The main parameters that the user can control are, for example, the amplitude, the time period of the vibration, and the vibration frequency.

Figure 4:
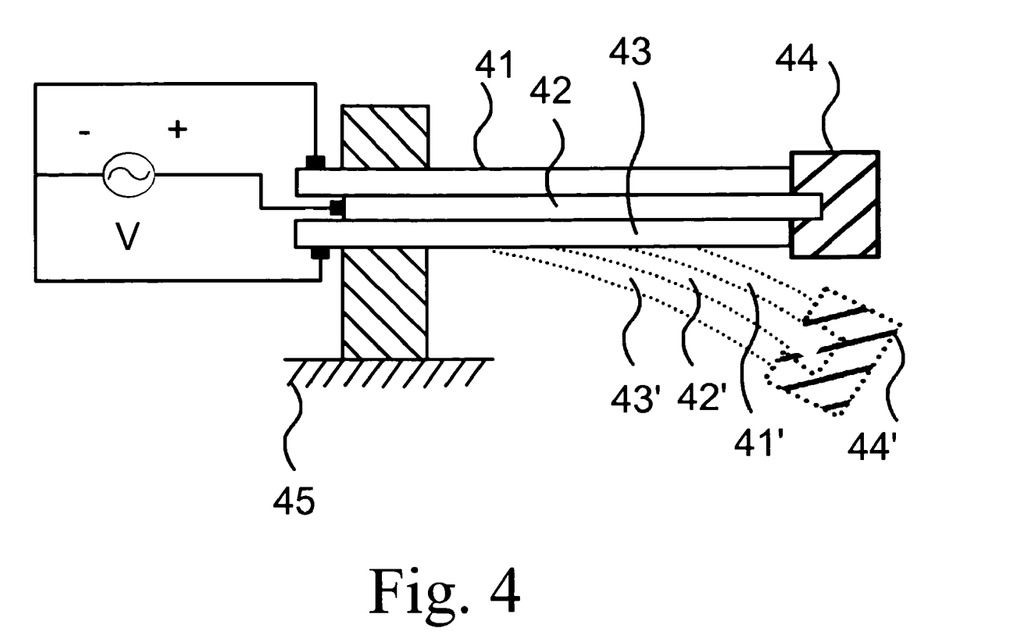
FIG. 4 is a side view of a parallel type mass-loaded piezo-bender, according to a preferred embodiment of the present invention.

FIG. 4 is a side view of a parallel type mass-loaded piezo-bender in accordance with a preferred embodiment of the present invention. Here, the metal beam 42 is placed between the piezo-ceramic layers 41 and 43. The metal beam 42 extends beyond the piezo-ceramic layers 41 and 43 and has a mass 44 mechanically coupled to the extended end of the metal beam 42. The mass 44 may be spot welded to the metal beam 42, and provides a vibratable body at one end of the cantilever structure. The other end of the piezo-bender is clamped to the lens or housing 45. When an electrical driving signal is applied, for example across the opposing surfaces of the piezo layers, the tip of the piezo-bender begins to deflect. The deflections at the resonance frequency of the piezo-bender are significantly greater than without the mass because of the extension of metal beam 42 beyond the piezo-ceramic layers 41, 43 and because of the mass 44 at the end of beam 42. The vibrating mass 44' and vibrating bender tend to impart greater impulses to the lens or housing 45 through each vibration cycle. In accordance with the present invention, the resonating vibrating elements utilized in implementing several different functions, whereas in prior-art solutions each function requires a dedicated component. Therefore, valuable space savings are realized in electronic hand-held devices and, above all, power consumption is minimized. This is a very important and advantageous feature in electronic hand-held devices.

The present invention additionally provides a solution using only a single component to generate feedback, resulting in significant space savings on the Printed Circuit Board (PCB) since the number of components needed on the PCB is reduced. The present invention also presents a low-cost solution because of the savings in the components.

Also in accordance with the present the feedback can be electrically adjusted. By adjusting the drive signal, a desired feedback can be achieved. The adjustment can be set manually by the user or automatically by the device itself. The present invention furthermore provides a dynamic user interface and an integrated low-cost and low-power solution for producing multi-functional feedback.

It should be noted that the piezo-bender component is not itself necessarily able to generate all of the feedback signals (i.e. a haptic feedback signal, a buzzer signal, a vibratory alert signal, and an audio signal) described herein in accordance with the present invention. However, the situation is different when the piezo-bender is attached to another component, as for example to a lens, or to a certain part of a housing, or to a PCB board. Together with the component to or on which the piezo-bender is attached, multi-functional feedback can be generated as herein described.

It will be apparent to persons skilled in the art that with the advancement of technology, the basic concept of the invention may be implemented in a variety of different ways. The invention and its implementation are thus not intended to be limited to the particular embodiments and examples described hereinabove, but may rather vary within the scope of the appended claims.

Thus, while there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electronic device for generating user detectable multi-functional feedback with a single component in response to a stimulus signal, the electronic device including a housing, a display, and electronic circuitry located in the housing, an improvement of the electronic device comprising:

a lens covering the display, the lens having a transparent area placed over the display;

force sensors attached to the lens for detecting a touch against the lens, the force sensors producing a stimulus signal in response to the touch;

at least one resonating vibrating element attached to an area of said lens extending outside of the display, said single component comprising the lens and the at least one resonating vibrating element, the at least one resonating vibrating element being operable to produce at least two feedback signals selected from a group consisting of a haptic feedback signal, a vibratory alert signal, an audio signal, and a buzzer signal; and an electrical drive circuit electrically coupled to said at least one resonating vibrating element for electrically driving said at least one resonating vibrating element with a drive signal based on the stimulus signal; and wherein one of the housing and said lens is manufactured so that at least one of its resonating frequencies is within a frequency range of said at least one resonating vibrating element.

2. The electronic device according to claim 1, the electronic device being a hand-held electronic device.

3. The electronic device according to claim 1, the electronic device further comprising:

means for determining the resonance frequency of one of the housing and the lens by producing a bursted frequency sweep;

means for detecting a vibration level with said force sensors; and means for feeding an obtained frequency to said at least one resonating vibrating element.

4. The electronic device according to claim 1, said at least one resonating vibrating element being operable as an acceleration sensor.

5. The electronic device according to claim 1, said at least one resonating vibrating element comprising a piezo-bender of one of a unimorph, a bimorph and a multilayer structure.

6. The electronic device according to claim 5, the electronic device further comprising an external mass attached to said piezo-bender.

7. An electronic device for generating user detectable multi-functional feedback with a single component in response to a stimulus signal, the electronic device including a housing, a display, and electronic circuitry located in the housing, an improvement of the electronic device comprising:

a lens covering the display, the lens having a transparent area placed over the display;

force sensors attached to the lens for detecting a touch against the lens, the force sensors producing a stimulus signal in response to the touch;

at least one resonating vibrating element attached to an area of said lens extending outside of the display, said single component comprising the lens and the at least one resonating vibrating element, the at least one resonating vibrating element being operable to produce at least two feedback signals selected from a group consisting of a haptic feedback signal, a vibratory alert signal, an audio signal, and a buzzer signal; and an electrical drive circuit electrically coupled to said at least one resonating vibrating element for electrically driving said at least one resonating vibrating element with a drive signal based on the stimulus signal;

wherein the lens is attached to the housing of the electronic device and the resonating vibrating element is attached to the lens so that in response to the drive signal the resonating vibrating element makes the lens resonate at an audible frequency.

8. A dynamic user interface for generating user detectable multi-functional feedback with a single component in response to a stimulus signal in a device that includes a housing, a display, and electronic circuitry located in the housing, the dynamic user interface comprising:

a lens covering the display, the lens having a transparent area placed over the display;

force sensors attached to the lens for detecting a touch against the lens, the force sensors producing a stimulus signal in response to the touch;

at least one resonating vibrating element attached to an area of said lens extending outside of the display, said single component comprising the lens and the at least one resonating vibrating element, the at least one resonating vibrating element being operable to produce at least two feedback signals selected from a group consisting of a haptic feedback signal, a vibratory alert signal, an audio signal, and a buzzer signal; and an electrical drive circuit (DC) electrically coupled to said at least one resonating vibrating element for electrically driving said at least one resonating vibrating element with a drive signal based on said stimulus signal;

wherein one of the housing and said lens is manufactured so that at least one of its resonating frequencies is within a frequency range of said at least one resonating vibrating element.

9. The dynamic user interface according to claim 8, wherein the device is a hand-held electronic device.

10. A dynamic user interface for generating user detectable multi-functional feedback with a single component in response to a stimulus signal in a device that includes a housing, a display, and electronic circuitry located in the housing, the dynamic user interface comprising:

a lens covering the display, the lens having a transparent area placed over the display;

force sensors attached to the lens for detecting a touch against the lens, the force sensors producing a stimulus signal in response to the touch;

at least one resonating vibrating element attached to an area of said lens extending outside of the display, said single component comprising the lens and the at least one resonating vibrating element, the at least one resonating vibrating element being operable to produce at least two feedback signals selected from a group consisting of a haptic feedback signal, a vibratory alert signal, an audio signal, and a buzzer signal; and an electrical drive circuit (DC) electrically coupled to said at least one resonating vibrating element for electrically driving said at least one resonating vibrating element with a drive signal based on said stimulus signal;

wherein the lens is attached to the housing of the electronic device and the resonating vibrating element is attached to the lens so that in response to the drive signal the resonating vibrating element causes the lens to resonate at an audible frequency.

11. The dynamic user interface according to claim 8, further comprising:

means for determining a resonance frequency of one of the housing and the lens by producing a bursted frequency sweep;

means for detecting a vibration level with said force sensors; and means for feeding an obtained frequency to said at least one resonating vibrating element.

12. The dynamic user interface according to claim 8, wherein said at least one resonating vibrating element is operable as an acceleration sensor.

13. The dynamic user interface according to claim 8, wherein said at least one resonating vibrating element comprises a piezo-bender of one of a unimorph, a bimorph and a multilayer structure.

14. The dynamic user interface according to claim 13, wherein the dynamic user interface further comprises an external mass attached to said piezo-bender.

15. An electronic device for generating user detectable multi-functional feedback with a single component in response to a stimulus signal, the electronic device including a housing, a display, and electronic circuitry located in the housing, an improvement of the electronic device comprising:

a lens covering the display, the lens having a transparent area placed over the display;

force sensors attached to the lens for detecting a touch against the lens, the force sensors producing a stimulus signal in response to the touch;

at least one vibrating element attached to an area of said lens extending outside of the display, said single component comprising the lens and the at least one resonating vibrating element, the at least one resonating vibrating element being operable to produce at least two feedback signals selected from a group consisting of a haptic feedback signal, a vibratory alert signal, an audio signal, and a buzzer signal;

an electrical drive circuit electrically coupled to said at least one vibrating element for electrically driving said at least one resonating vibrating element with a drive signal based on the stimulus signal;

means for determining the resonance frequency of one of the housing and the lens by producing a bursted frequency sweep;

means for detecting a vibration level with said force sensors; and means for feeding an obtained frequency to said at least one resonating vibrating element.

16. A dynamic user interface for generating user detectable multi-functional feedback with a single component in response to a stimulus signal in a device that includes a housing, a display, and electronic circuitry located in the housing, the dynamic user interface comprising:

a lens covering the display, the lens having a transparent area placed over the display;

force sensors attached to the lens for detecting a touch against the lens, the force sensors producing a stimulus signal in response to the touch;

at least one resonating vibrating element attached to an area of said lens extending outside of the display, said single component comprising the lens and the at least one resonating vibrating element being operable to produce at least two feedback signals selected from a group consisting of a haptic feedback signal, a vibratory alert signal, an audio signal, and a buzzer signal;

an electrical drive circuit electrically coupled to said at least one resonating vibrating element for electrically driving said at least one resonating vibrating element with a drive signal based on said stimulus signal;

means for determining a resonance frequency of the housing and the lens by producing a bursted frequency sweep;

means for detecting a vibration level with said force sensors; and means for feeding an obtained frequency to said at least one resonating vibrating element.

* * * * *

UNITED STATES PATENT AND TRADEMARK OFFICE
CERTIFICATE OF CORRECTION

| | | |
|---|---|---|
| PATENT NO. | : 7,324,094 B2 | Page 1 of 1 |
| APPLICATION NO. | : 10/840174 | |
| DATED | : January 29, 2008 | |
| INVENTOR(S) | : Hannu Moilanen | |

It is certified that error appears in the above-identified patent and that said Letters Patent is hereby corrected as shown below:

On the Title Page should read Item --[73] Myorigo, S.a.r.l., ~~Wilmington, DE (US)~~ Luxembourg (LU)--

Signed and Sealed this

Seventh Day of April, 2009

JOHN DOLL
*Acting Director of the United States Patent and Trademark Office*